(12) United States Patent
Stratton (10) Patent No.: US 9,108,596 B2
(45) Date of Patent: Aug. 18, 2015

(54) CONTROLLER FOR, AND METHOD OF, OPERATING A SENSOR CLEANING SYSTEM

(71) Applicant: Caterpillar Inc., Peoria, IL (US)

(72) Inventor: Kenneth L. Stratton, Dunlap, IL (US)

(73) Assignee: Caterpillar Inc., Peoria, IL (US)

(\*) Notice: Subject to any disclaimer, the term of this patent is extended or adjusted under 35 U.S.C. 154(b) by 28 days.

(21) Appl. No.: 13/953,064

(22) Filed: Jul. 29, 2013

(65) Prior Publication Data

US 2015/0032292 A1 Jan. 29, 2015

(51) Int. Cl.
*B60S 1/52* (2006.01)
*B60S 1/62* (2006.01)
*B60R 1/06* (2006.01)

(52) U.S. Cl.
CPC .......................... *B60S 1/62* (2013.01)

(58) Field of Classification Search
USPC .......................... 701/2, 31.4, 34.4
See application file for complete search history.

(56) References Cited

U.S. PATENT DOCUMENTS

| 2009/0301517 | A1 | 12/2009 | Asayama et al. | |
|---|---|---|---|---|
| 2012/0117745 | A1 | 5/2012 | Hattori et al. | |
| 2012/0182424 | A1* | 7/2012 | Heenan et al. | 348/148 |
| 2013/0117745 | A1* | 5/2013 | Kamiyama et al. | 718/1 |
| 2013/0146577 | A1* | 6/2013 | Haig et al. | 219/202 |
| 2013/0255023 | A1* | 10/2013 | Kikuta et al. | 15/250.02 |
| 2013/0306165 | A1* | 11/2013 | Shank et al. | 137/340 |

FOREIGN PATENT DOCUMENTS

WO 2007/134993 A1 11/2007
WO 2012/138455 A1 10/2012

\* cited by examiner

*Primary Examiner* — Tan Q Nguyen
(74) *Attorney, Agent, or Firm* — BakerHostetler (57) ABSTRACT

A control system for a vehicle sensor cleaning system is provided. The control system includes: a microcontroller configured to: receive inputs including at least one input from any one of the following sources: sensors, other controllers, and an operator; determine whether a signal to actuate a cleaning system for a sensor should be generated; analyze whether the signal should be delayed; sending an actuating signal to a sensor cleaning system if the controller determines that predetermined cleaning criteria are met and delays sending the actuating signal if the controller determines delay criteria are met. A method of controlling a sensor washing system may also be provided. The method includes: inputting signals from at least two sensors into a controller; weighing the inputted signals, wherein one of the signals is associated with a location of the vehicle on which the sensor washing system is located; determining whether to send a signal to actuate a sensor cleaner depending upon the weighing of the inputted signals; and sending a signal to the sensor cleaner to clean a sensor.

14 Claims, 5 Drawing Sheets

CONTROLLER FOR, AND METHOD OF, OPERATING A SENSOR CLEANING SYSTEM

TECHNICAL FIELD

This patent disclosure relates generally to a controller and a method of operating a sensor cleaning system. More particularly, this disclosure is related to a controller and a method of operating a sensor cleaning system for sensors used on off-highway vehicles.

BACKGROUND

Off-highway vehicles are becoming more and more sophisticated. Many off-highway vehicles are equipped with sensors and/or cameras that are useful in assisting the operator of the vehicle with the vehicle's operation. In some instances, the operator of the vehicle may be an onboard human operator, an onboard vehicle controller, an off-board human operator or off-board computer controller. Many these off-highway vehicles may be used as part of a system comprising several off-highway vehicles.

Examples of such systems may be found in the mining industry. Mobile machines or vehicles, such as haul trucks and other types of heavy equipment, are often used to haul material from a load location at which the material is loaded into the machines, to a dump location at which the material is discharged from the machines. In order to maintain productivity and efficiency at a worksite while accomplishing predetermined cycles, travel of machines to and from at the dump and loading locations and positioning of the discharge and loading material should be carefully managed. A need to properly manage vehicles and/or machines at the worksite can be even more important when machines or vehicles are working on high wall operations and are autonomously controlled.

To assist in controlling various machines and/or vehicles, various sensors including cameras are used. Due to dirt, debris, dust or other contaminates, the cameras and/or sensors can degrade in performance. In order to restore the performance of the sensors and/or cameras sensor washing systems are used. The sensor washing systems currently known may be activated by a user or automatically activated based on the expiration of a set time period. Other controllers for sensor cleaning systems may rely on various settings on the machine such as which gear the transmission is in, detecting that an IG switch is turned to an off position or when an image from a camera contains dirt. Such a system is described in US published patent application number US 2012/0117745. However, these control systems do not account for other factors which may play an important part in a determination of whether or not to subject a sensor to a cleaning operation.

SUMMARY

In one aspect, the disclosure describes a control system for a vehicle sensor cleaning system. The control system includes: a microcontroller configured to: receive inputs including at least one input from any one of the following sources: sensors, other controllers, and an operator; determine whether a signal to actuate a cleaning system for a sensor should be generated; analyze whether the signal should be delayed; sending an actuating signal to a sensor cleaning system if the controller determines that predetermined cleaning criteria are met and delays sending the actuating signal if the controller determines delay criteria are met.

In another aspect, the disclosure describes a method of controlling a sensor washing system. The method includes: inputting signals from at least two sensors into a controller; weighing the inputted signals, wherein one of the signals is associated with a location of the vehicle on which the sensor washing system is located; determining whether to send a signal to actuate a sensor cleaner depending upon the weighing of the inputted signals; and sending a signal to the sensor cleaner to clean a sensor.

In one aspect, the disclosure describes a control system for a vehicle sensor cleaning system comprising: a vehicle; sensors attached to the vehicle configured to detect characteristics associated with the vehicle; a sensor cleaning system configured to, when actuated, clean at least one of the sensors; a microcontroller operatively connected to the sensor cleaning system, the microcontroller configured to: receive inputs including at least one input from any one of the following sources: the sensors, other controllers, and an operator; determine whether a signal to actuate a cleaning system for a sensor should be generated; analyze whether the signal should be delayed; sending an actuating signal to the sensor cleaning system if the controller determines that, predetermined cleaning criteria are met and delays sending the actuating signal if the controller determines delay criteria are met.

DETAILED DESCRIPTION

A system for managing the cleaning of onboard machine sensors, including perception sensors such as cameras associated with vehicles working on a website is described herein. Vehicles in accordance with the disclosure may include autonomous vehicles, semi-autonomous vehicles, on-board and off-board operator controlled vehicles. These vehicles may include an automated wash system for the sensors in order to assist the sensors in providing useful information. Based on various inputs, a controller determines a time for cleaning the various sensors and sends a signal actuating a sensor washing system. This may be based on input from various machine sensors or other input that allows the controller to determine the current machine operation and/or position compared to a work-site map and determine a time and/or location to initiate a cleaning sequence. In some embodiments, the controller may initiate the cleaning of all sensors or may only clean one or some of the sensors. For the purposes of this document the term "sensor" should be interpreted to include not only typical sensors, but also include, but not be limited to, cameras or other optical detectors.

Various embodiments will be described in more detail below with reference to the figures. Like features will be referred to by a like reference numerals in the figures and in the other parts of the application.

Figure 1:
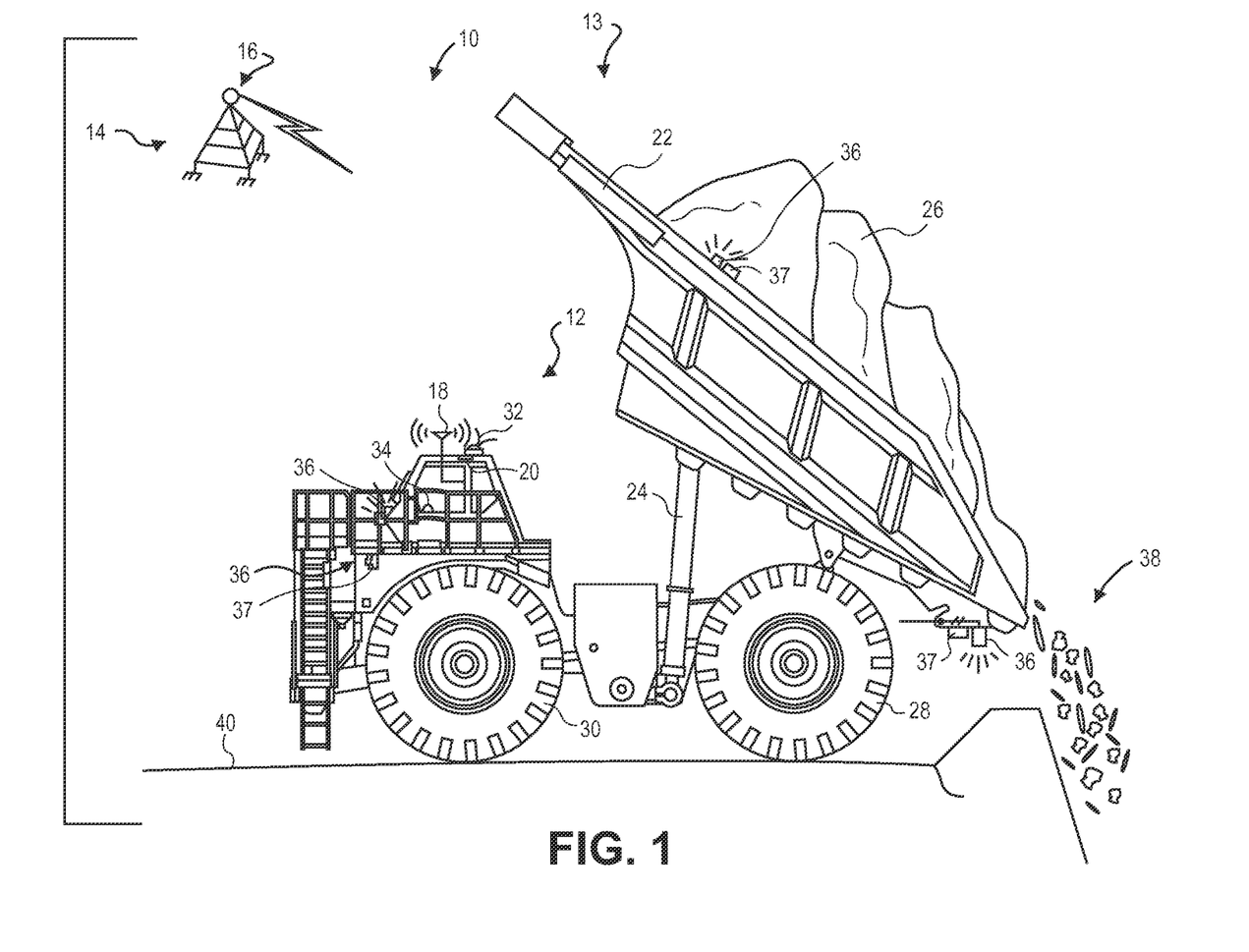
FIG. 1 is a side view of an example machine having a control system in accordance with the present disclosure in wireless communication with a worksite system controller.

FIG. 1 illustrates an automation system 10 including a vehicle 12. The automation system 10 may be used to control multiple vehicles 12 at a worksite 13. The automation system 10 includes a worksite system controller 14. The controller 14 includes a transmitter/receiver 16 that is configured to communicate with a transmitter/receiver 18 located on the vehicle 12. The vehicle 12 may be equipped with a vehicle controller 20. The controllers described herein may be microcontrollers or any other suitable type controller.

The vehicle 12 illustrated in FIG. 1 is a dump vehicle 12 having a dump bed 22. The dump bed 22 is actuated by actuation cylinders 24. The actuation cylinders 24, when actuated, lift the dump bed 22 causing the load 26 located in the dump bed 22 to fall out of the dump bed 22. The actuation cylinders 24 can be controlled to retract causing the dump bed 22 to return to a load carrying position. Actuation of the dump vehicle 12 is well known and will not be described in further detail here.

The vehicle 12 also includes wheels 28 and 30. In embodiments in accordance with the disclosure, the vehicle 12 may be equipped with tracks or any other suitable device for moving the vehicle. The wheels 28 and 30 shown on the vehicle 12 are meant to be exemplary only and are not limiting to the present disclosure. The vehicle 12 may include a cab 32. The cab 32 may be equipped with manual controls 34 that allow an operator to manipulate the vehicle 12. In other embodiments, the vehicle 12 may be an autonomous vehicle and therefore not be equipped with the cab 32 or manual controls 34.

The vehicle 12 may be equipped with a variety of sensors/cameras 36. The sensors/cameras 36 are operatively connected to the vehicle controller 20 and are configured to provide signals indicative of conditions sensed or observed by the sensor/cameras 36. The positions of the sensors/cameras 36 shown in FIG. 1 are meant to be nonlimiting examples. The sensors/cameras 36 can be located at a variety of locations on the vehicle 12.

The vehicle 12 illustrated in FIG. 1 is a dump vehicle dumping a load 26 at a dump site 38. However, in other embodiments, other types of vehicles such as, but not limited to, dozers, trucks, graders, loaders, tractors, harvesters, excavators, or any other type of vehicle 12 may be used in accordance with an automation system 10 in accordance with the present disclosure.

Figure 2:
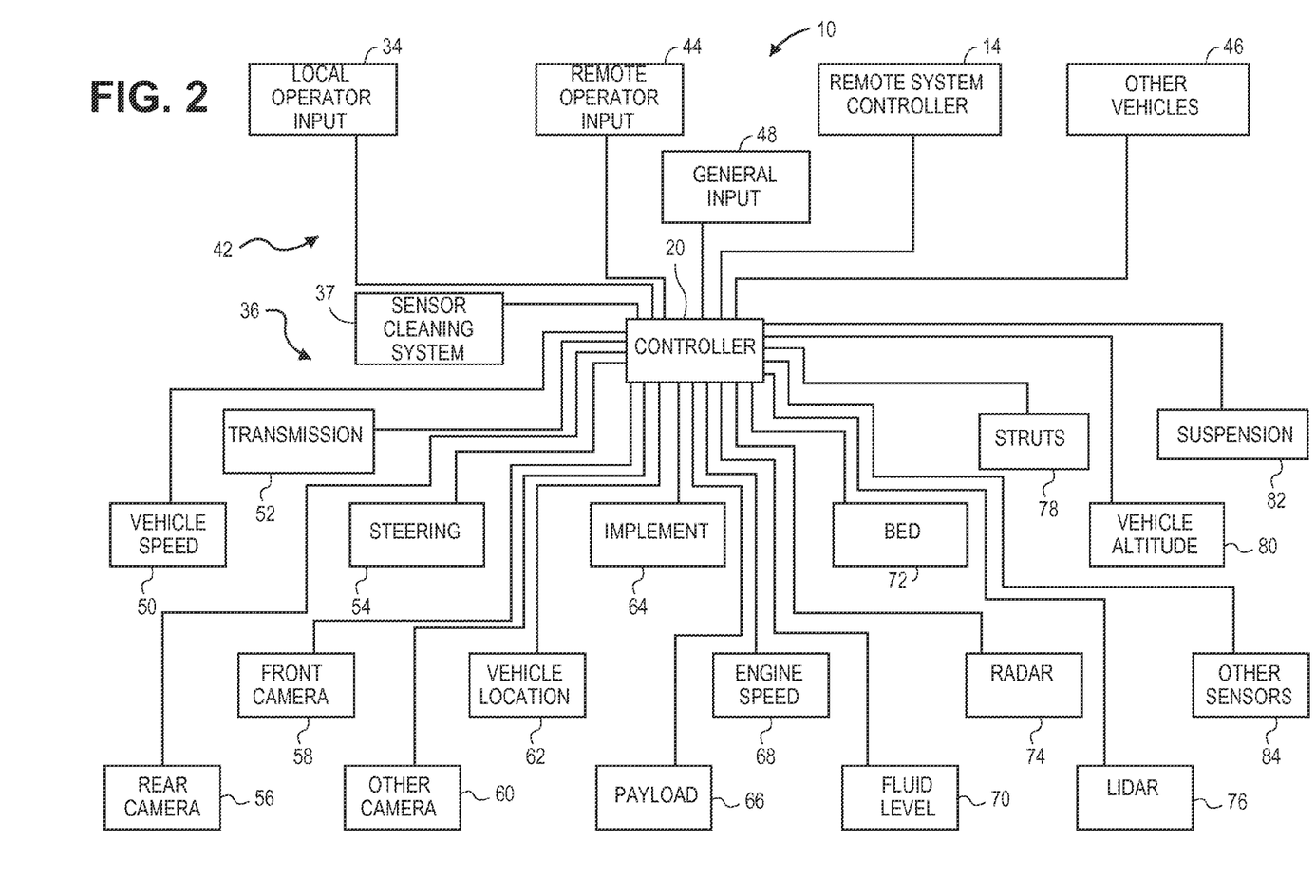
FIG. 2 is a schematic diagram of a controller having various inputs and connections to various sensors.

FIG. 2 illustrates a schematic diagram of an automation system 10 in accordance with the disclosure. A variety of sensors/cameras 36 are operatively connected to a vehicle controller 20. The vehicle controller 20 is also operatively connected to a variety of inputs 42. The controller 20 is also operatively connected to the sensor cleaning system 37 to activate the sensor cleaning system 37 to clean one, all, or some of the sensors 36. The controller 20 may receive inputs 42 from a local operator input 34, a remote operator input 44, a general input 48, a remote system controller 14, or from other vehicles 46 located at a worksite 13.

The local operator input 34 may provide input to the controller 20 via manual controls 34 (shown in FIG. 1). An onboard operator, when manipulating the controls 34, may input signals into the controller 20. Alternatively or in addition, the vehicle 12 may be operated by a remote operator rather than an onboard operator. In such instances, the remote operator will operate the vehicle 12 from a remote location. Signals sent to the vehicle 12 from the remote operator may be inputted into the controller 20. The remote operator input 44 may be entered in the controller 20 in any variety of ways suitable for a particular application. For example, the remote operator input 44 may be inputted into the controller 20 wirelessly or through a wired system or any other suitable communication method.

Vehicles 12 that are part of a large system that is controlled by a controller 14 may receive input into the vehicle controller 20 from the remote system controller 14. Further, other vehicles 46 that are part of the system 10 may also input data into the controller 20. Any other sources of data or input into the controller 20 may be done via a general input 48.

The vehicle controller 20 may also receive data or signals from the sensors/cameras 36. The sensors/cameras 36 are operatively connected to the controller 20 to provide images or signals sensed or observe from the sensor/camera 36. Examples of sensors or cameras 36 will be described below. It will should be understood that the listing of sensors and/or cameras 36 describe below is meant to be exemplary and is not intended to be a comprehensive list nor are all the sensors or cameras described below required to be part of an automation system 10 in accordance with the present disclosure.

A vehicle speed sensor 50 may be located on the vehicle 12 and configured to ascertain the speed of the vehicle 12 and input the data into the controller 20. A transmission sensor 52 may be located at the transition of a vehicle 12 and configured to sense and indicate what gear the transmission is in. For example, the transmission sensor 52 could determine whether the transmission is in a forward, neutral, or reverse gear. Further, the transmission sensor 52 could determine which gear, whether it be in a forward or reverse gear, the transmission is in and transmit this data to the controller 20. The steering sensor 54 is configured to determine what position the steering system is in. For example, the steering sensor 54 could determine whether the steering system on the vehicle 12 will make the vehicle 12 go to the right, to the left, straight ahead, or any degree in between. The steering sensor 54 is also be configured to input the data into the controller 20.

Vehicles 12 may be equipped with a rear camera, front camera and/or other camera 56, 58, and 60. The cameras 56, 58, and 60 may be configured to transmit the images observed by the cameras 56, 58, 60 to the controller 20.

Vehicle location sensors 62 may be configured to identify the location of the vehicle 12. This may be the accomplished by using GPS or any other suitable locating technique. The vehicle location sensors 62 will input its data into the controller 20. In some embodiments, the vehicle location sensors 62 and or the controller 20 may be able to locate the vehicle 12 in relation to a worksite map 86 (See FIG. 3). This will be discussed in more detail later on below. An implement sensor 64 may be configured to sense the condition or position of a vehicle's implement such as a blade, a dump bed, a shovel, a bucket, or any other implement which a vehicle 12 may be equipped. The implement sensor 64 is configured to transmit the condition, attitude, and/or location of the implement to the controller 20. For example, the implement sensor 64 may be attached to actuation cylinders 24 and can sense whether the cylinders 24 are in an extended, retracted, or intermediate position. In instances where the vehicle 12 is a dump vehicle, the actuation cylinders 24 move the dump bed 22. However, in other embodiments and on other vehicles 12, the actuation cylinders 24 may actuate a different implement than the dump bed 22. For example, the actuation cylinders 24 may be operatively connected to other implements such as, but not limited to, a bucket, lifting forks, a blade, or any other implement which may be associated with a vehicle 12.

A payload sensor 66 may be configured to determine whether the vehicle 12 is carrying a payload and how much of a payload or how much with respect to a payload maximum the vehicle 12 is caring. For example, in the case of a dump vehicle 12, the payload sensor 66 may be configured to determine how much of a load 26 is located in the dump bed 22. Such a sensor 66 can determine how heavy the load being carried in the load bed 22 is. In other vehicles, the payload sensors 66 could determine how much of a load 26 is located in a bucket or any other implement. In still other embodiments, the payload sensors 66 could determine how much force is being exerted on a blade or shovel. Other payload sensors 66 in accordance with this disclosure may make other similar type determinations and input the data into the controller 20.

An engine speed sensor 68 may sense an engine speed in revolutions per minute (RPM) or any other way of measuring engine speed and input this data into the vehicle controller 20. A fluid level sensor 70 may be configured to sense amounts of various fluids in the respective reservoirs and input this data into the controller 20. For example, the fluid level sensor 70 could detect how much cleaning fluid is in the reservoir of a sensor cleaning system 37. That information is then reported to the vehicle controller 20 and used by the vehicle controller 20 in determining whether or not to activate the sensor cleaning system 37.

In some embodiments, a bed sensor 72 may be configured to indicate what pos on the dump bed 22 is located. The sensor 72 could indicate whether the bed 22 is in an up or dumping configuration or a standard flat lying configuration or anywhere in between. Optionally, a RADAR sensor 74 may be used to determine if there are any objects that are appearing within the range of the vehicle radar system. For example, if the vehicle 12 has a radar system that allows it to determine if it is approaching too close to another vehicle or some other object, if a vehicle or object appears on the scope of the radar system this data could be transmitted from the radar sensor 74 to the controller 20. Similarly a LIDAR sensor 76 may be used if a vehicle 12 is equipped with a laser LIDAR system to determine if there are any objects within range or within a tolerance in the range of the vehicle LIDAR system.

Strut sensors 78 could be configured to indicate what position the actuation cylinders or struts 24 are disposed. Whether they are extended, retracted, or in an intermediate position. This type of sensor could be used to help determine the position of an implement associated with the vehicle.

In some embodiments, the vehicle 12 could be equipped with a vehicle attitude sensor 80 which can be configured to sense a variety of attitudes the vehicle 12 may be positioned in. For example the attitude sensor 80 may indicate which way the vehicle is oriented in 3D space similar to an aircraft along the yaw, pitch, and roll axes.

A suspension sensor 82 may be configured to provide data to the controller 20 regarding the status of the suspension system of the vehicle 12. The sensor could provide data indicating that the vehicle 12 is loaded if the suspension system is in a compressed state or the vehicle was not loaded if the suspension system was not in a compressed state. By separately analyzing the various wheels associated with the vehicle 12, the suspension sensor 82 could determine if one or more wheels were off the ground or if the suspension associated with one or more wheels was in a very compressed state compared with the other wheels, this would indicate that this wheel on top of a projection (such as a rock or other object projecting up from the ground).

Other sensors 84 can also be configured to analyze various attributes of the vehicle 12 or components of the vehicle 12 and be operatively connected to the controller 20 to provide data to the controller 20. The various sensors 36 and inputs 42 are operably connected to the controller 20 to provide data to the controller 20. In some embodiments, the controller 20 may also send signals back to the sensors 36 or inputs 42 to request information, confirm receipt of the instructions or data, or for any other purpose. The sensors 36 and other inputs 42 may be operatively connected, whether wirelessly hardwired or any other suitable way of putting the sensors 36 inputs 42 and controller 20 in communication with each other.

Figure 3:
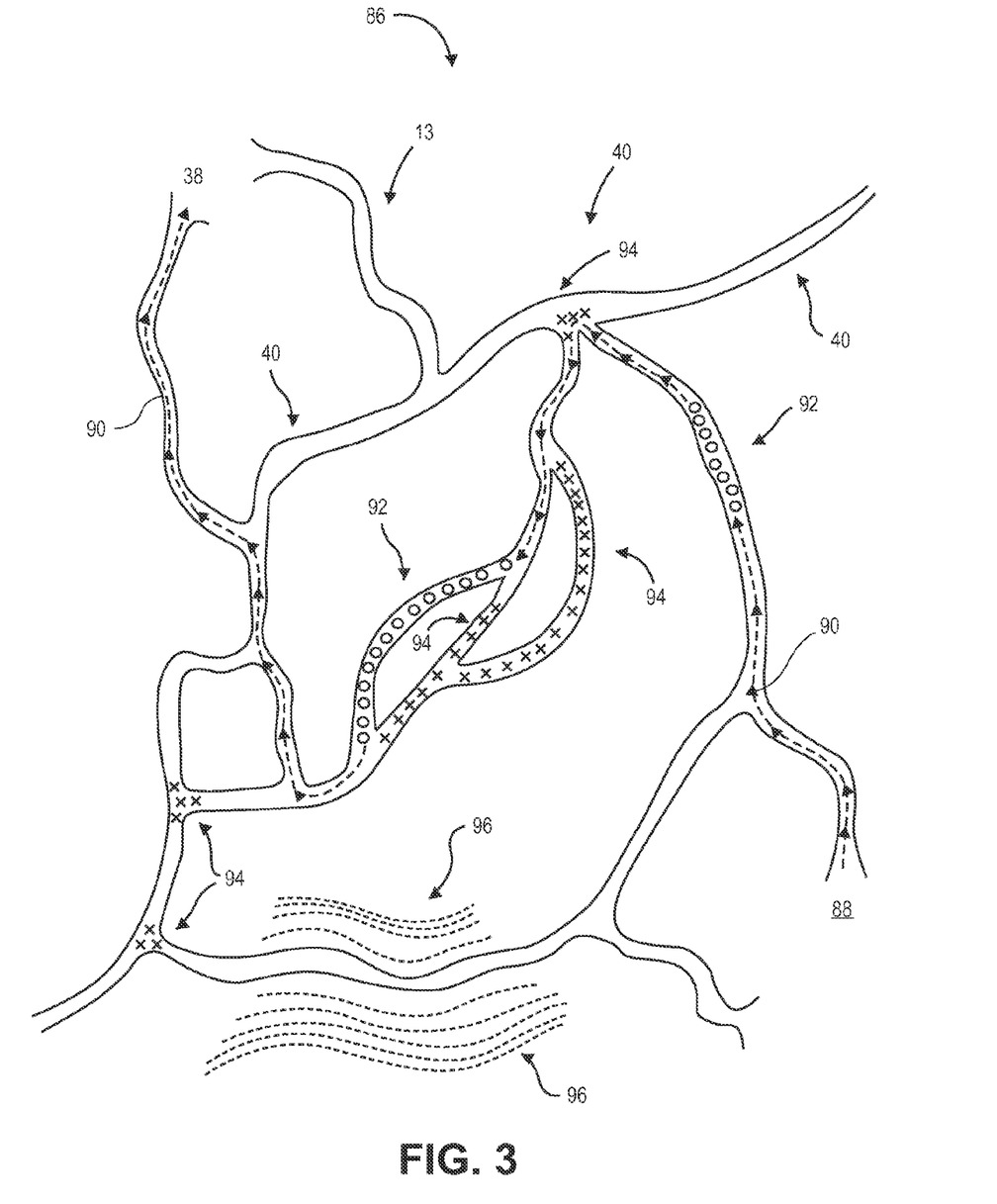
FIG. 3 is an example map of a worksite, illustrating various features, roads and characteristics of an example worksite.

FIG. 3 is an example site map 86 and may represent a typical worksite 13. The site map 86 indicates a particular area that is indicated as a loading station 88. At the loading station 88 various vehicles are used for loading a payload onto other vehicles. For example dump vehicles 12 may be loaded by loaders at the loading station 88. Roadways 40 are indicated on the map 86. The roadways 40 may be improved or unimproved roads along which vehicles 12 may travel. A specific pathway 90 is illustrated with broken lines and arrows along the roads 40 to indicate a common pathway used between the loading station 88 and the dump station 38.

The dump station 38 may be an area designated for dump vehicles 12 to dump their loads 26. The pathway 90 travels along the various roads 40 which may include delay areas or queue areas 92. The delay area or queue area 92 is an area where vehicles 12 often are backed up due to congestion or some other factor. Other areas on the map 86 may be designated as high-traffic areas 94. The high-traffic areas 94 may be designated areas that are important to keep traffic moving. Therefore, vehicles 12 should eliminate or minimize any delays while traveling through the high-traffic areas 94. For example, in accordance with an embodiment, the controller 20 may be configured to ensure that the sensor cleaning system 37 does not clean any of the sensors 36 while the vehicle 12 is in a high-traffic area 94 thereby ensuring that the vehicle 12 will not need to stop due to a failure or incorrect reading of the sensor 36 resulting from the sensor 36 being cleaned. Other areas noted on the map 86 may show topographical features 96 as indicated.

In some embodiments, the vehicle location sensor 62 detects the location of the vehicle 12 with respect to the map 86. Thus, the vehicle location sensor 62 can determine whether the vehicle 12 is located at the dump station 38, loading station 88, in the delay area or queue area 92, at a high-traffic area 94, or any other area on the map 86. In some embodiments, the location sensor 62 alone may not locate the vehicle 12 with respect the map 86 but the combination of data from the location sensor 62 inputted into the controller 20 allows the controller 20 to know where the vehicle 12 is with respect to the site map 86.

Optionally, the location sensor 62 be part of various systems for making a determination of location. For example, the location sensor 62 may use global positioning satellites (GPS), Inertial Navigation System (INS), dead reckoning, Perception Based Localization (PBL) or any other system suitable for making a determination of location.

The feature of the controller 20 and/or the vehicle location sensor 62 determining the location of the vehicle 12 with respect to the site map 86 can be useful in allowing the controller 20 to make a determination of whether it is desired (or the vehicle is a desired location) for the controller 20 initiate a sensor cleaning sequence. As stated above, there may be times when it is not desired for the sensors 36 to be cleaned. This may be due to the fact that during a cleaning sequence the sensors 36 may not be able to provide reliable data to the controller 20 due to interference from the cleaning process.

For example, if the sensor 36 is a camera and the image provided may be distorted not clear. Other sensors 36 which may not be cameras may also provide unreliable readings due to the effects of the cleaning process. In some embodiments, the vehicle 12 may not be operated when sensors 36 provide unreliable data to the controller 20. In such instances, the sensors may only be cleaned when the vehicle 12 is stopped. Therefore, it may be useful for the controller 20 recognize that the vehicle 12 is located in a high-traffic area 94 and therefore undesirable for the vehicle to stop. In such instances, the controller 20 may delay cleaning the sensors 36 until the vehicle 12 has moved out of a high-traffic area 94. White the present application describes high-traffic areas 94 as places to not clean the sensors 36 other areas at the site map 86 may likewise be undesirable to clean the sensors. However, for the sake of this document, places where it is undesirable for the vehicle to be located during a sensor 36 cleaning operation will simply be referred to as high-traffic areas 94.

Figure 4:
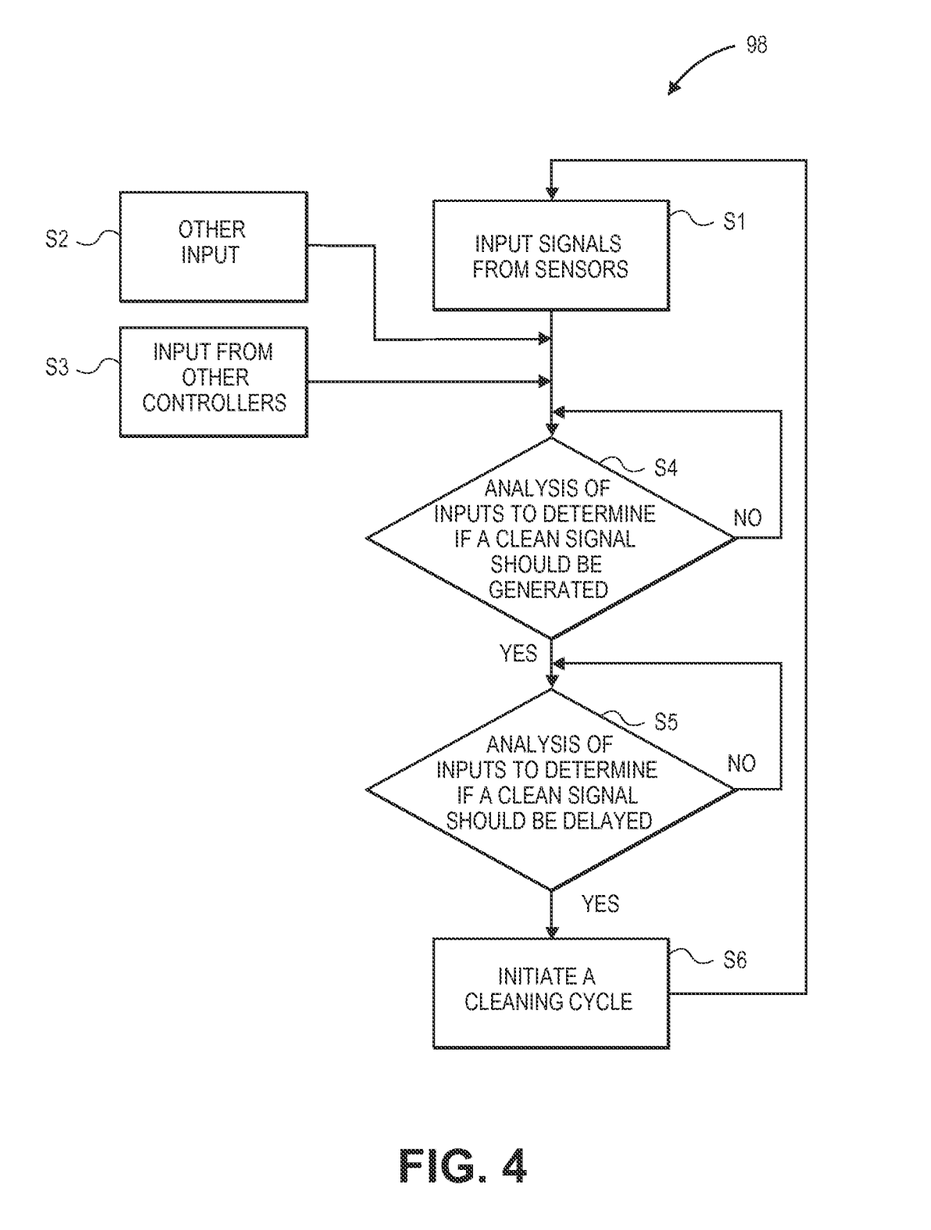
FIG. 4 is a flowchart illustrating example steps of a method of in accordance with the disclosure.
Figure 5:
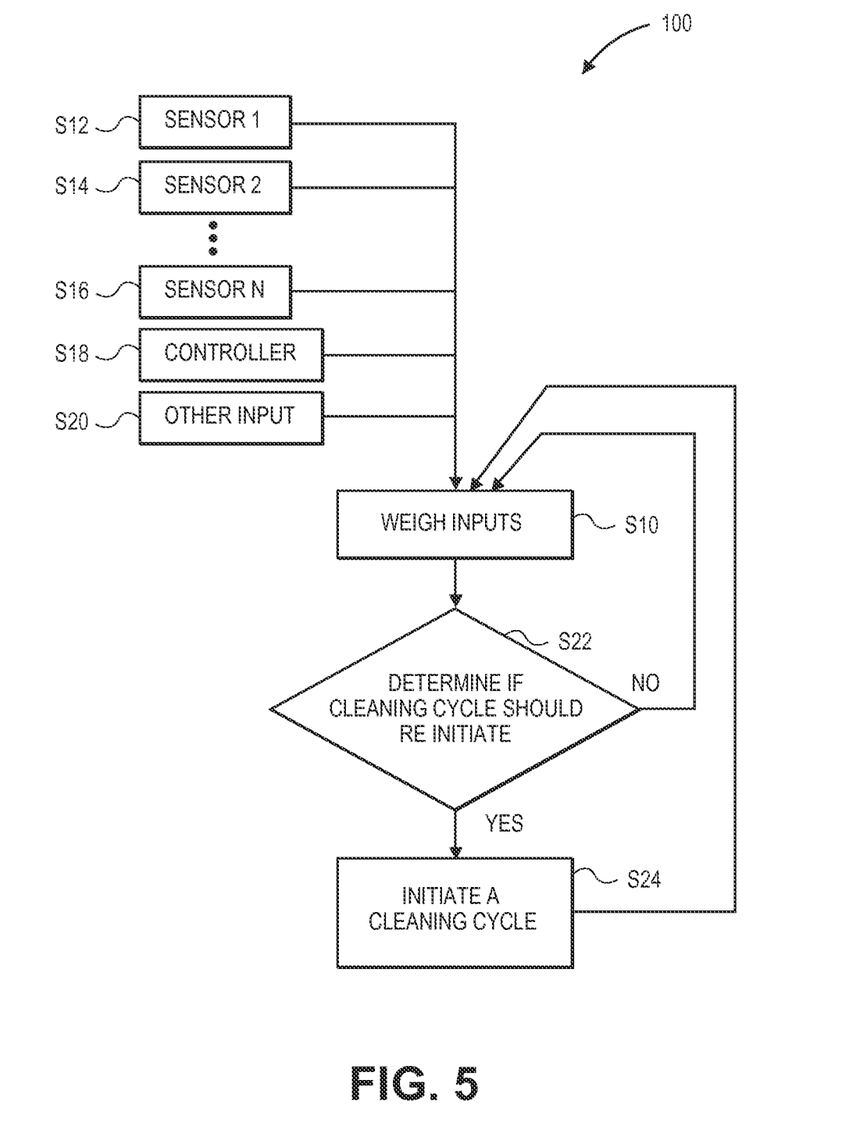
FIG. 5 is a flowchart illustrating example steps of a method in accordance with another embodiment described in the disclosure.

FIGS. 4 and 5 illustrate two methods 98 and 100 which illustrate how the controller 20 calculates when to initiate a sensor cleaning operation. As shown in FIG. 4 at S2, the controller 20 receives signals input from the sensors 36. At step S2 the controller 20 may receive other signals as input from the local operators 34, remote operators 44, other vehicles 46 and other inputs 48. At step S3, the controller 20 may receive input from the system controller 14.

At step S4, the controller 20 analyzes the inputs to determine if a clean signal should be generated or, in other words, the controller 20 should send a signal the sensor cleaning system 37 to clean one or more of the sensors 36. In some embodiments, the controller 20 may instruct the sensor cleaning system 37 to clean all the sensors 36. In other embodiments, the controller 20 may send a signal instructing the sensor cleaning system to clean only one, all, or some of the sensors 36.

The specific logic used by the controller 20 to make a determination of whether it is desirable to generate a signal to the sensor cleaning system 37 may be modified according to the specific needs of a vehicle 12 or jobsite 13. Likewise, which sensors 36 are used and how much weight to assign signals from various sensors 36 may also be customized for vehicle 12 or jobsite 13 needs.

If the controller 20 determines that a clean signal does not need to be generated, then the method 98 has the controller 20 not generate any cleaning signal but continues to receive input as outlined with respect the steps S1, S2, and S3 and analyze the input to determine if a clean signal should be generated. On the other hand, if the controller 20 at step S4 determines based on the various inputs that a cleaning signal should be generated, the method moves to step S5.

At step S5 the controller 20 conducts analysis of the inputs 42 to determine whether the clean signal should be delayed from being sent to the sensor cleaning system 37. For example, even though it may be determined that the sensors 36 are in need of cleaning, there may be reasons why the sensors 36 should not be cleaned at the moment. For example, the vehicle 12 may be moving and it may be possible that a given sensor 36 cannot or should not be cleaned while the vehicle 12 is moving. Thus, the cleaning should be delayed until the vehicle 12 stopped. Another reason could be that the vehicle 12 is stopped in a congested zone and is about to move forward and thus the cleaning should be delayed until the vehicle has moved out of a congested zone. There could be a variety of other reasons why would be desirable to delay cleaning various sensors 36.

In some embodiments, some of the sensors 36 may be cleaned right away while other sensors 36 may be subject to a delay before the sensor cleaning system 37 cleans them. This disclosure does not require the sensor cleaning system 37 clean all the sensors 36 at the same time. For example, some sensors may be cleaned while the vehicle 12 is moving while other sensors 36 may not be cleaned while the vehicle 12 is moving. One of ordinary skill in the art after reviewing this disclosure can make a determination of which sensors 36 may be cleaned under various conditions and program the controller 20 only to clean various sensors 36 when certain conditions are met.

FIG. 5 illustrates another method 100 in accordance with the disclosure. In the method 100 illustrated in FIG. 5, at steps S12-S16, various sensors 36 input data into the controller 20. Step S12 illustrates a first sensor and step S14 and step S16 illustrates all the various other sensors 36 (if any) inputting data to the controller 20. As discussed above, one of ordinary skill the art after reviewing this disclosure will understand what sensors 36 are desired to be inputted into the controller 20 and can input the data flow sensors into the controller 20 at steps S12 through S16. Step S18 illustrates input from various external controllers such as the remote system controller 14, controllers associated with other vehicles 46 or any other external controllers. Step S20 represents other inputs inputting data into the controller 20. For example, the other inputs could be a local operator input 34, remote operator input 44, or any other general input 48. At step S10 the controller 20 weighs the input from the various sensors 36 and inputs 42. The various sensors 36 or inputs 42 may be assign different weights according to the specific needs of the system to achieve cleaning the sensors 36 at desired times and not clean the sensors 36 when it is not desirable to clean them.

At step S22, the controller 20 has weighed the inputs and determines whether a cleaning cycle should be initiated. The controller 20 may determine whether to clean none, all, one, or some of the sensors 36. If the controller 20 determines that a specific sensor 36 or group of sensors 36 should be cleaned, the controller 20 will initiate a cleaning cycle at step S24. If a sensor 36 or group of sensors 36 should not be cleaned, the method 100 goes back to weighing the various inputs at step S10. As the various inputs change and are re-weighted at step S10 the method 100 moves to step S22 to determine whether a cleaning cycle tier none, one, all, or some of the sensors 36 should be initiated at step S22.

INDUSTRIAL APPLICABILITY

The present disclosure is applicable to control systems for controlling a sensor cleaning systems 37. The control system 10 described herein can be useful in determining whether or not a specific sensor 36 or group of sensors 36 need to be cleaned. By not cleaning the sensors 36 when they do not need to be cleaned may result in increased efficiency by not wasting cleaning fluid, time, and exerting wear on the sensor cleaning system 37. Further efficiencies may be gained by not preventing the vehicle 12 from performing its normal duties while the sensors 36 are cleaned unnecessarily. Further, additional efficiencies can be gained by not cleaning the sensors 36 at undesired times. Rather, when it is determined that the sensors 36 are in need of cleaning, the controller 20 may delay cleaning the sensors 36 and determine the vehicle 12 is located at a suitable place to stop and or slow down and then clean the sensors 36. As result of this feature, efficiencies may be gained by not stopping or slowing down vehicles 12 at undesirable places along a worksite 13.

According to some embodiments, the controller 20 may determine that a sensor 36 is in need of cleaning if the sensor 36 reports a degraded signal. For example an optical sensor 36 or camera 36 may show dirt or an obscured view. For example, the degradation of the sensor 36 may be detected by using reflected signal distance (time of flight) or strength from known reflectors or other signal heuristics. Once the degradation is detected the controller 20 may determine that the operating task, either from onboard sensors 36 and heuristics (like a machine performance monitor), from a system controller 14, from the current operation and/or from the location of the vehicle 12 makes it an opportune time to wash the sensors 36. For example, if the signal strength is 30% derogated and it is estimated the machine is going to be stationary for a time, the controller 20 may provide a wash signal to the sensor cleaning system 37. Alternatively, the vehicle controller 20 or system controller 14 may use a timing function to send a clean signal to the cleaning system 37 after a set time expires.

In some embodiments, the controller 20 may determine that when certain events occur, it may be assumed that dirt or dust is affecting the sensor 36. In such an instance, the controller 20 may be programmed to have an event-based cleaning of the sensors 36. For example, whenever a vehicle 12 is loaded, dumps or is otherwise unloaded, the controller 20 may assume that dust is kicked up resulting in need for cleaning the sensors 36.

Once it is determined that cleaning should occur, the system 10 may next determine whether the vehicle 12 is at a location where sensor cleaning may occur or if it would be better to delay cleaning the sensors 36 until the vehicle 12 has moved to a different location. For example, cleaning may only occur at service locations, loading areas, while stopped in a queue, dump areas, or other specifically designated location. Comparing position of the vehicle 12 to the site map 86 or site path plan that has set parameters to the actual position of the vehicle 12, the controller 20 may determine whether to send an actuating signal to the cleaning system 37 or to delay sending a actuating signal to the cleaning system 37. In other embodiments the location may only be one aspect considered by the controller 20 in deter whether or not to clean the sensors 36.

In other embodiments, machine sensors 36 may be cleaned at a loading location 88 or dump location 38 but these locations may not necessarily be identified or located with respect to a map 86. In such instances, the controller 20 may assume a dumping operation has occurred based on a detection of the transition being placed into a reverse gear Wowed by a zero vehicle speed or movement followed by a detected raise of the dump bed 22 or other implement been actuated. After these three events have occurred, the controller 20 may institute a cleaning operation. In other embodiments, the controller 20 may delay a cleaning operation for a set time after certain events have occurred in order for dust to settle after a dumping or loading operation.

In another embodiment, if the suspension is jostled significantly (as would be the case during a loading or unloading operation) the controller 20 may initiate a cleaning operation or wait a specific time after detecting the suspension jostling in order to allow dust to settle and then initiate a cleaning operation. In another embodiment, machine sensors 36 may detect when the vehicle 12 has stopped. If the stop occurs after a reverse and then a positive increase in payload has occurred, the controller 20 may assume the vehicle 12 has just been loaded and that the sensors 36 need to be cleaned. In some embodiments, the sequence of stopping after the transmission has gone through the reverse gear followed by an increase in payload or suspension jostling may initiate a timing sequence to allow dust to settle after which the controller 20 may initiate a sensor cleaning operation.

In another embodiment, machine sensors 36 may detect when the vehicle 12 has stopped. If the stop occurs after a reverse and then a significant decrease in payload has occurred, the controller 20 may assume the vehicle 12 has just been unloaded and that the sensors 36 need to be cleaned. In some embodiments, the sequence of stopping after the transmission has gone through the reverse gear followed by a decrease in payload or suspension jostling may initiate a timing sequence to allow dust to settle after which the controller 20 may initiate a sensor cleaning operation.

In some embodiments, the controller 20 may detect whether there are several step increases in payload or several suspension jostling's which would simulate a vehicle 12 being loaded multiple times before reaching its capacity. The controller 20 may count a certain number of events such as two or three, or any number of jostling's or increases in payload after the vehicle 12 has moved into the reverse gear, reversed and then stopped before initiating a cleaning sequence. In other embodiments, the controller 20 may not detect a specific number of events but may wait a certain amount of time after there has been a shift in the transmission into reverse and then a stop and then increases in payload or suspension jostling. If a certain amount of time passes after the last increase in payload or jostling, the controller 20 may assume that the loading event is over and then initiate a cleaning sequence after some time has passed in order to allow dust to settle.

In another embodiment cleaning may occur when vehicle 12 is sitting in a queue and is stopped. The controller 20 may determine the vehicle 12 is sitting in a queue based on the vehicle being stopped and located at a certain position with respect to the site map 86 or as indicated by system controller 14 letting the vehicle controller 20 know that the vehicle 12 is in a waiting mode. At such time, the controller 20 on the vehicle 12 may initiate a cleaning sequence.

In some embodiments, certain inputs initiate a cleaning sequence. For example, if a local or remote operator wants to initiate a cleaning sequence with respect to one or more sensors 36 the operator may put input to the controller 20 a command to clean the sensors 36. In some embodiments, the controller 20 will then see if there is a reason to delay cleaning the sensors 36. In other embodiments, controller input, whether remote or local, will override reasons for delay will immediately cause to controller 20 to initiate a cleaning sequence. In other embodiments, the system controller 14 may instruct the vehicle controller 20 to initiate a cleaning sequence with respect to one or more sensors 36. In some embodiments, the vehicle controller 20 will then decide whether to initiate or delay cleaning the sensors 36. In other embodiments, the remote system controller 14 will act as an override and will immediately require the controller 20 to initiate a cleaning of the sensors 36.

After reviewing this disclosure one of ordinary skill the art will understand what inputs a controller 20 should consider to determine whether or not to clean one or more sensors 36. A variety of different algorithms considering various inputs may be used in accordance with the present disclosure.

I claim:

1. A control system for a vehicle sensor cleaning system comprising:
   a microcontroller configured to:
   receive inputs including at least one input from any one of the following sources: sensors, other controllers, and an operator;
   determine whether a signal to actuate a cleaning system for a sensor should be generated;
   analyze whether the signal should be delayed;
   sending an actuating signal to a sensor cleaning system if the controller determines that predetermined cleaning criteria are met and delaying sending the actuating signal if the controller determines delay criteria are met.

2. The control system of claim 1, wherein the microcontroller is configured to further delay transmitting the actuating signal if the delay criteria are continuing to be met and transmitting the actuating signal if the controller determines that criteria for further delay are not met.

3. The control system of claim 1, wherein the controller is configured to determine that a signal to actuate the cleaning system for a sensor should be generated when the controller receives inputs indicating that a cleaning necessitating event has occurred.

4. The control system of claim 3, wherein the cleaning necessitating event includes any one of the following:
   a) a user inputs into the controller a sensor cleaning command;
   b) a master system controller external to the vehicle inputs into the controller a sensor cleaning command;
   c) debris is detected on a sensor;
   d) a loading event has occurred; and
   e) an unloading event has occurred.

5. The control system of claim 1, wherein the controller is configured to determine that the signal should be delayed if the controller receives a signal indicating that a level of cleaning fluid associated with the sensor cleaning system falls below a set amount.

6. The control system of claim 1, further comprising:
   a vehicle;
   sensors attached to the vehicle configured to detect characteristics associated with the vehicle; and
   a sensor cleaning system configured to, when actuated, clean at least one of the sensors.

7. A control system for a vehicle sensor cleaning system comprising:
   a microcontroller configured to:
      receive inputs including at least one input from any one of the following sources: sensors, other controllers, and an operator;
      determine whether a signal to actuate a cleaning system for a sensor should be generated;
      analyze whether the signal should be delayed;
      sending an actuating signal to a sensor cleaning system if the controller determines that predetermined cleaning criteria are met and delaying sending the actuating signal if the controller determines delay criteria are met,
      wherein the controller is configured to determine that a signal to actuate the cleaning system for a sensor should be generated when the controller receives inputs indicating that a cleaning necessitating event has occurred, and
      wherein an unloading event is determined to have occurred when sensors indicate that a reverse in transmission speed followed by a zero vehicle velocity followed by a raise of the dump bed and a set time to allow dust to settle has transpired.

8. The control system of claim 7, further including a sensor indicating that the vehicle has become unloaded.

9. The control system of claim 7, further including a sensor indicating that the vehicle is located at a designated dump location.

10. A control system for a vehicle sensor cleaning system comprising:
    a microcontroller configured to:
       receive inputs including at least one input from any one of the following sources: sensors, other controllers, and an operator;
       determine whether a signal to actuate a cleaning system for a sensor should be generated;
       analyze whether the signal should be delayed;
       sending an actuating signal to a sensor cleaning system if the controller determines that predetermined cleaning criteria are met and delaying sending the actuating signal if the controller determines delay criteria are met,
       wherein the controller is configured to determine that a signal to actuate the cleaning system for a sensor should be generated when the controller receives inputs indicating that a cleaning necessitating event has occurred,
       wherein the cleaning necessitating event includes any one of the following:
          a) a user inputs into the controller a sensor cleaning command;
          b) a master system controller external to the vehicle inputs into the controller a sensor cleaning command;
          c) debris is detected on a sensor;
          d) a loading event has occurred; and
          e) an unloading event has occurred,
       wherein a loading event is determined to occurred when sensors indicate a reverse in transmission speed followed by a zero vehicle velocity followed by an increase in payload and a set time to allow dust to settle has transpired.

11. The control system of claim 10, further including a sensor indicating that the vehicle is located as a designated loading location.

12. A control system for a vehicle sensor cleaning system comprising:
    a microcontroller configured to:
       receive inputs including at least one input from any one of the following sources: sensors, other controllers, and an operator;
       determine whether a signal to actuate a cleaning system for a sensor should be generated;
       analyze whether the signal should be delayed; and
       sending an actuating signal to a sensor cleaning system if the controller determines that predetermined cleaning criteria are met and delaying sending the actuating signal if the controller determines delay criteria are met,
       wherein the controller is configured to determine that a signal to actuate the cleaning system for a sensor should be generated when the controller receives inputs indicating that a cleaning necessitating event has occurred, and
       wherein the cleaning necessitating event includes determining that the vehicle is located at an approved sensor cleaning location.

13. The control system of claim 12, wherein an approved sensor cleaning location includes any one of the following: a designated service location, a loading location and unloading location and a waiting location.

14. A control system for a vehicle sensor cleaning system comprising:
    a microcontroller configured to:
       receive inputs including at least one input from any one of the following sources: sensors, other controllers, and an operator;
       determine whether a signal to actuate a cleaning system for a sensor should be generated;
       analyze whether the signal should be delayed; and
       sending an actuating signal to a sensor cleaning system if the controller determines that predetermined cleaning criteria are met and delaying sending the actuating signal if the controller determines delay criteria are met,
       wherein the controller is configured to determine that the signal should be delayed if the vehicle is located at a position that has been previously determined as a location where sensor cleaning is not approved.

* * * * *